United States Patent [19]

Hsu

[11] Patent Number: 5,895,539

[45] Date of Patent: Apr. 20, 1999

[54] METHOD OF MAKING A TWO-SIDED FIBERGLASS TAPE MEASURE WITH TWO DIFFERENTLY COLORED NYLON RESIN COATING

[76] Inventor: Cheng-Hui Hsu, No.126, Pad Chung Road, Hsin Tien City, Taipei Hsien, Taiwan

[21] Appl. No.: 08/965,941

[22] Filed: Nov. 7, 1997

[51] Int. Cl.$^6$ ....................................................... G01B 3/10
[52] U.S. Cl. ............................. 156/180; 33/755; 33/771; 156/166; 156/277; 427/195
[58] Field of Search ......................... 33/755, 771, 765; 156/166, 180, 277; 427/185, 195

[56] References Cited

U.S. PATENT DOCUMENTS

| | | | |
|---|---|---|---|
| 202,610 | 4/1878 | Ward | 33/771 |
| 1,936,998 | 11/1933 | Summers | 33/771 |
| 3,205,583 | 9/1965 | Purbaugh | 33/755 |
| 4,574,486 | 3/1986 | Drechsler | 33/771 X |
| 5,062,215 | 11/1991 | Schlitt | 33/771 |

*Primary Examiner*—Jeff H. Aftergut
*Attorney, Agent, or Firm*—Pro-Techtor International Services

[57] ABSTRACT

Method of making a two-sided fiberglass tape measure with two differently colored nylon resin coatings characterized particularly in that a device is used that can coat simultaneously both sides of a fiberglass tape, both top and bottom, in a single forming step, yet producing two different colorations.

2 Claims, 3 Drawing Sheets

METHOD OF MAKING A TWO-SIDED FIBERGLASS TAPE MEASURE WITH TWO DIFFERENTLY COLORED NYLON RESIN COATING

BACKGROUND OF THE INVENTION

This invention relates to a method of making a two-sided fiberglass tape measure with two differently colored nylon resin coatings, characterized particularly in that a device is used that can coat simultaneously both sides of fiberglass tapes, both top and bottom, in a single forming step that produces two different colors.

A general method for making a fiberglass tape measure comprises the following steps: numerous strands of fiber glass yarn, typically 26 strands, are aligned uniformly through an aligning racket, followed by a baking step. After heating, the fiberglass yarn is pulled in an orderly manner through a positioning grid into a mold containing 26 holes aligned in a horizontal line. A coating device is used to coat said fiberglass yarn before it is introduced into a 13.5 mm wide, 0.5 mm thick forming apparatus, so that a blank single colored tape is formed. The tape is then pressed in a roller, followed by printing of the scales. The process of making a fiberglass tape measure is thus completed. However, as is well known, tape measures have scales on both sides, with a metric scale on one side, and a standard scale on the other. My aim as the inventor of this method, facing the fact that the traditional technology of making fiber glass tape measures requires a breakthrough, was to make a fiberglass tape measure characterized by two distinctive colors, while simultaneously overcoming the technical limitations of the traditional method of producing a fiber glass tape measure coated with a one-color nylon resin. After intensive study and development aimed at improving the process for the production of the invented product and after many trials and amendments, I eventually, developed the Method for Producing a Two-sided Fiberglass Tape Measure with Two Differently Colored Nylon Resin Coatings, which is the subject of this invention.

The aim of this invention was to provide a method for producing a double-sided fiberglass tape measure with two differently colored nylon resin coatings, so that each side of the fiberglass tape measure displays its own distinctive color, while simultaneously overcoming the technical limitations of the traditional method for making fiberglass tape measures with a one-color nylon resin coating.

In order to understand in greater detail the features of the forming method, and the gist of the claim, the following description is provided, accompanied by manufacturing flow diagrams. The advantages of this invention will then be understood more readily.

BRIEF DESCRIPTIONS OF THE DRAWINGS

DESCRIPTION OF THE INVENTION

Figure 1:
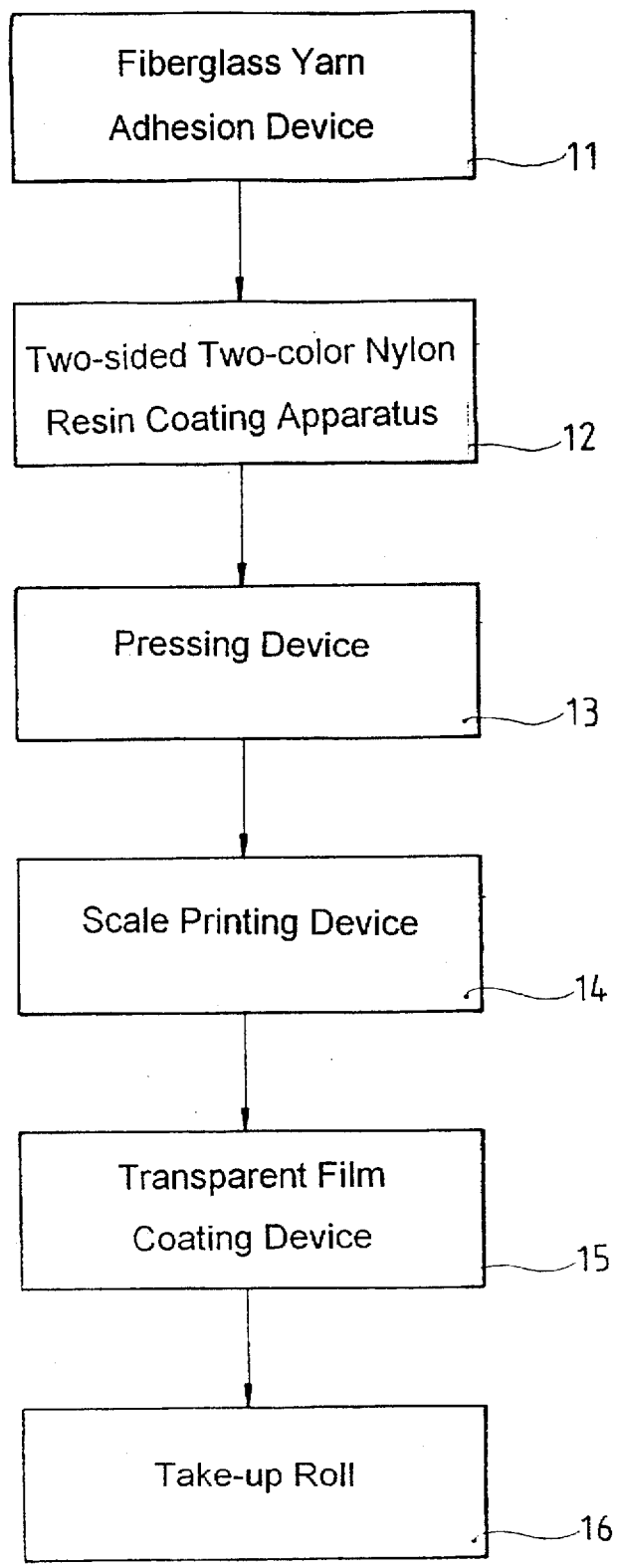
FIG. 1 is the basic flow diagram for the device.
Figure 2:
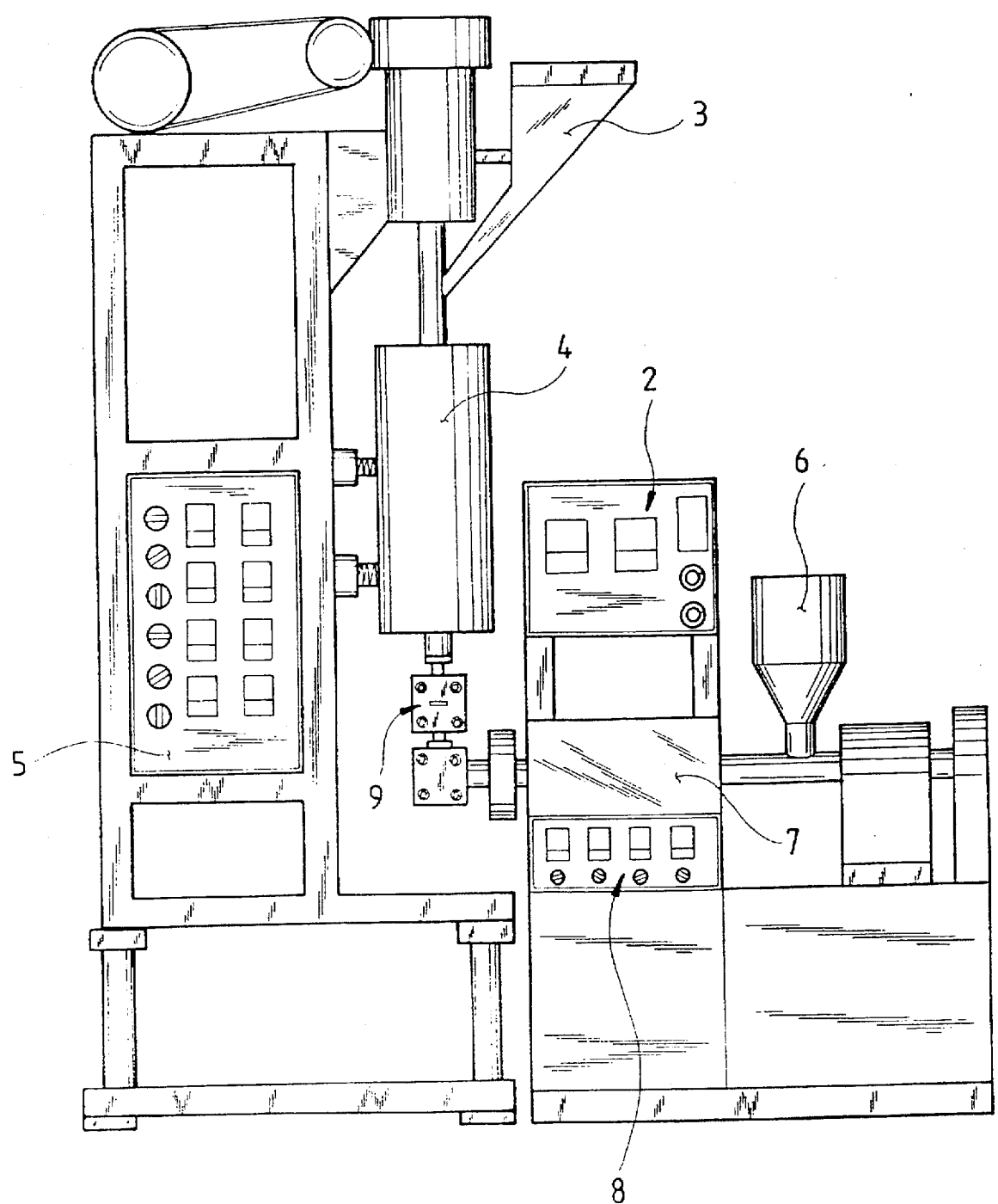
FIG. 2 is a structural diagram of the device for coating two differently colored nylon resins.

Referring first to FIG. 1, the process according to this invention relates to a method for producing a two-sided fiberglass tape measure with two differently colored nylon resin coatings. It comprises a fiber glass yarn adhesion device (11), a two-sided two-color nylon resin coating apparatus (12), a pressing device (13), a scale printing device (14), a transparent film coating device (15) and a take-up rolling device (16), etc. Now let us take a look at FIG. 2. Here one can see the two-sided two-color nylon resin coating device (12), representing the main element of this invention, the speed control device (2) which controls the speed at which the two-color nylon resin materials is processed. The nylon resin material of one color, in solid particle form, is fed through feeding funnel (3) into the heating device (4). By using the temperature control device (5), the solid particle nylon resin material is softened in the heating device (4) and converted to a fluid. The nylon resin material of the other color, also in solid particle form, is loaded through the feeding funnel (6) into the heating device (7). By using the temperature control device (8), the solid particle nylon resin material is softened in the heating device (7) to a fluid consistency. These two differently colored nylon resin materials are introduced separately through the top and the bottom of the forming device (9), so that the fiber glass tape can be coated simultaneously with two differently colored nylon resins.

Figure 3:
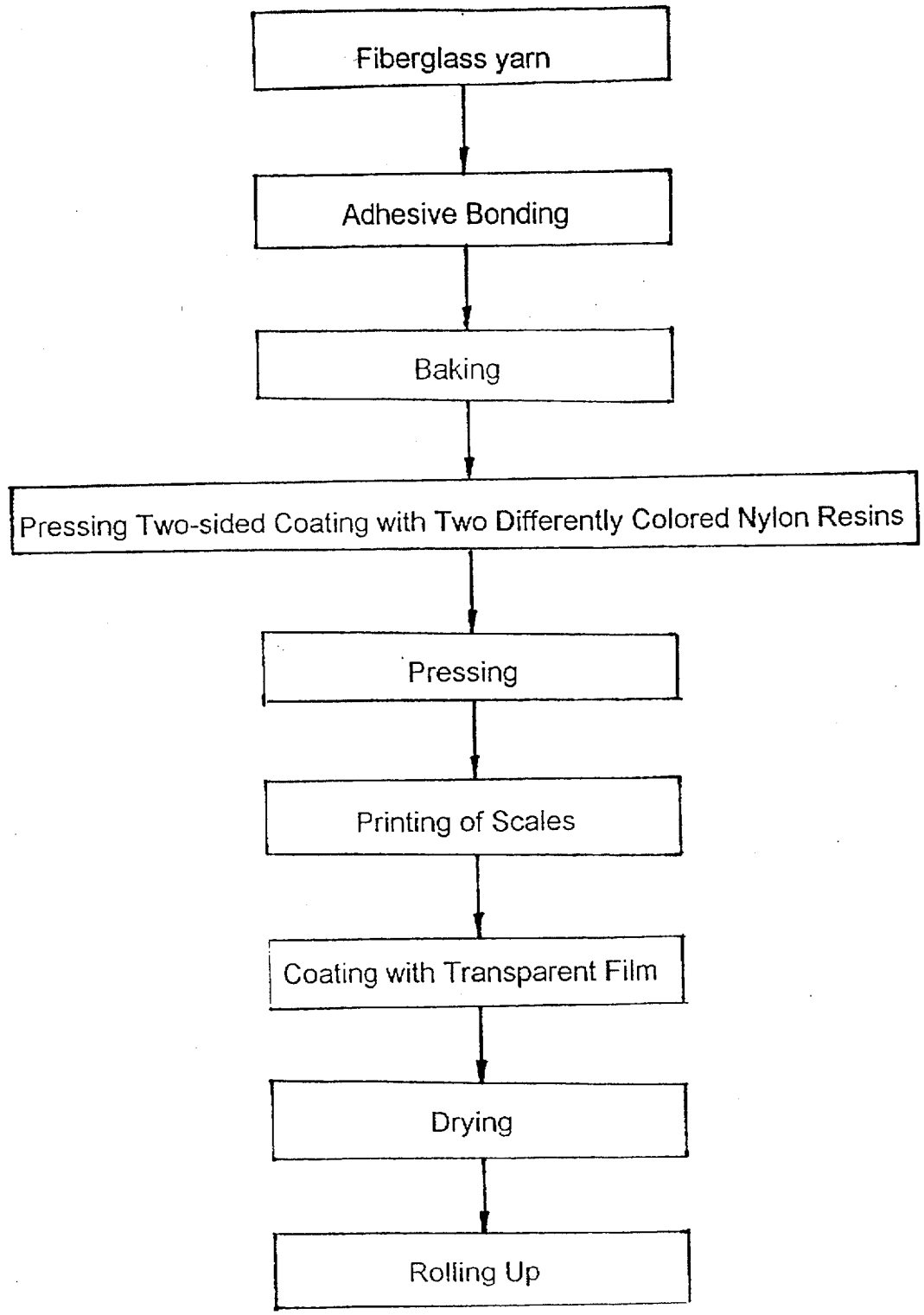
FIG. 3 is the manufacturing flow diagram.

FIG. 3 is a flow diagram of the process according to this invention, which includes the following steps:

(A) Alignment of numerous strands of fiberglass yarn into a horizontal linear fiberglass tape.

(B) Adhesive bonding of the fiberglass tape by means of an adhesion device.

(C) Moving the bonded fiberglass tape into a heating device at a speed of 25–30 meters per minute, and baking it at a minimum temperature of 390° C.

(D) Pressing the baked fiberglass tape.

(E) Guiding the so treated fiberglass tape into a nylon resin coating device to coat the front and the back of the tape with two differently colored nylon resins.

(F) Subjecting the double-coated two-color fiberglass tape to a pressing operation.

(G) Directing the fiberglass tape into a printing device to have the scales printed on both sides.

(H) Coating the printed fiberglass tape with a transparent film.

(I) Subjecting the fiberglass tape coated with the transparent film to a drying treatment and passing it through a roller for take up.

In summary, this invention, "A Method for Producing Two-sided Fiberglass Tape Measures with Two Differently Colored Nylon Resin Coatings" can truly realize the intended aim and purpose. It can also be valuable in commercial production.

I claim:

1. A method for producing two-sided fiberglass tape measures with two differently colored nylon resin coatings comprising the steps:

(a) alignment of a plurality of strands of fiberglass yarn into a horizontal linear fiberglass tape;

(b) adhesive bonding of the fiberglass tape using an adhesion device;

(c) moving the bonded fiberglass tape into a heating device at a rate of 25 to 30 meters per minute and baking it at a minimum temperature of 390° C.;

(d) pressing the baked fiberglass tape;

(e) guiding the fiberglass tape into a nylon resin coating device to coat the front and the back of the tape with two differently colored nylon resins;

(f) subjecting the two-coat two colored fiberglass tape to pressing;

(g) directing the fiberglass tape into a printing device to print scales on both sides;

(h) coating the printed fiberglass tape with a transparent film;

(i) drying the fiberglass tape with the transparent film coating. and (j) rolling up the fiberglass tape with a roller.

2. The method for producing two-sided fiberglass tape measures with two differently colored nylon resin coatings as claimed in claim 1, wherein the nylon resin coating device step (e) further comprises:

guiding the fiberglass tape into a nylon resin coating device comprising a speed control device which controls a feeding speed of the two differently colored nylon resin coatings, and wherein solid particles of a first nylon resin material of a first color are fed through a first feeding funnel into a heating device wherein a temperature control device causes the solid particle nylon resin material to be softened to a fluid state, and wherein solid particles of a second nylon resin material of a second color are loaded through a second feeding funnel into the heating device wherein a second temperature control device causes the solid nylon resin material to be softened in the heating device into a fluid state, thereby allowing the two differently colored nylon resin materials to be introduced separately through a top and a bottom of the coating device so that the fiber-glass tape is coated simultaneously with the two differently colored nylon resins.

* * * * *